United States Patent
Rosenberger

(10) Patent No.: US 9,943,885 B1
(45) Date of Patent: Apr. 17, 2018

(54) BBQ GRILL SCRAPER AND CLEANER

(71) Applicant: Jeffrey Rosenberger, Elizabethtown, PA (US)

(72) Inventor: Jeffrey Rosenberger, Elizabethtown, PA (US)

(73) Assignee: Charboss LLC, Elizabethtown, PA (US)

( * ) Notice: Subject to any disclaimer, the term of this patent is extended or adjusted under 35 U.S.C. 154(b) by 0 days.

(21) Appl. No.: 15/298,571

(22) Filed: Oct. 20, 2016

Related U.S. Application Data

(60) Provisional application No. 62/246,146, filed on Oct. 26, 2015.

(51) Int. Cl.
*A46B 13/02* (2006.01)
*A47J 37/07* (2006.01)
*B08B 1/00* (2006.01)

(52) U.S. Cl.
CPC .............. *B08B 1/005* (2013.01); *A46B 13/02* (2013.01); *A47J 37/0786* (2013.01)

(58) Field of Classification Search
CPC .......................... A46B 13/02; A47J 37/0786
See application file for complete search history.

(56) References Cited

U.S. PATENT DOCUMENTS

| | | |
|---|---|---|
| 269,767 A | 12/1882 | Wilson |
| 2,046,599 A | 7/1936 | Andrews |
| 2,747,911 A * | 5/1956 | Kuever .................. A47J 43/288 126/173 |
| 3,092,411 A | 6/1963 | Hardy |
| 3,229,316 A | 1/1966 | Matheson |
| D268,215 S | 3/1983 | McBride |
| D269,767 S | 7/1983 | Houlihan et al. |
| D324,747 S | 3/1992 | Rood |
| 5,373,600 A | 12/1994 | Stojanovski et al. |
| D362,936 S | 10/1995 | Shabel |
| D363,863 S | 11/1995 | Tipp |
| D379,256 S | 5/1997 | Tipp |
| D381,149 S | 7/1997 | Mayo |
| 6,039,372 A | 3/2000 | Noe et al. |
| D426,757 S | 6/2000 | McGrellis |
| 6,263,578 B1 | 7/2001 | Frantz et al. |
| 6,276,023 B1 * | 8/2001 | Grundy ............... A47J 37/0786 15/118 |
| 6,745,428 B2 | 6/2004 | MacLean |

(Continued)

FOREIGN PATENT DOCUMENTS

| | | |
|---|---|---|
| CA | 2023273 A1 | 2/1992 |
| CA | 2386483 A1 | 11/2003 |

(Continued)

*Primary Examiner* — Randall Chin
(74) *Attorney, Agent, or Firm* — Carter, DeLuca, Farrell & Schmidt, LLP

(57) ABSTRACT

A barbeque grill scraper that uses a scraping edge with a tooth formed of a wearable material to remove char and debris from the grill grates. The tooth fits between adjoining grill grates to guide the scraping edge and create a plurality of indents in the scraping edge that match the top profile of the grill grates. The grill grates are thus thoroughly cleaned without the health risks associated with wire brush cleaners. Another embodiment further utilizes a protruding cleaning tool to access and clean the lower sides and bottom of the grill grates.

18 Claims, 5 Drawing Sheets

(56) References Cited

U.S. PATENT DOCUMENTS

| | | |
|---|---|---|
| 7,013,524 B1 | 3/2006 | McIlree, Sr. |
| 7,039,983 B1 | 5/2006 | Outlaw |
| D537,591 S | 2/2007 | Gringer et al. |
| D539,105 S | 3/2007 | Bennett |
| D569,566 S | 5/2008 | Pfitzinger |
| D624,262 S | 9/2010 | Gringer |
| D651,485 S | 1/2012 | Michalek |
| D664,318 S | 7/2012 | Thompson et al. |
| D664,319 S | 7/2012 | Thompson et al. |
| D677,847 S | 3/2013 | Thompson et al. |
| 8,438,687 B2 | 5/2013 | Cybulski et al. |
| 8,741,068 B2 | 6/2014 | Thompson et al. |
| D753,890 S | 4/2016 | Zemel et al. |
| 9,545,173 B2* | 1/2017 | Brown ................. A23B 4/0523 |
| 2005/0150070 A1 | 7/2005 | Persichina et al. |
| 2005/0160544 A1 | 7/2005 | Geller |
| 2006/0207042 A1 | 9/2006 | Di Paolo |
| 2009/0031519 A1* | 2/2009 | Carpenter ........... A47J 37/0786 15/236.01 |
| 2009/0188061 A1 | 7/2009 | Cybulski et al. |
| 2011/0088265 A1 | 4/2011 | Madren |
| 2011/0258801 A1* | 10/2011 | Thompson .............. A47L 17/06 15/236.01 |
| 2014/0298606 A1 | 10/2014 | Thompson et al. |
| 2016/0060884 A1 | 3/2016 | Bemicke-Grussing et al. |

FOREIGN PATENT DOCUMENTS

| | | |
|---|---|---|
| CA | 2854057 A1 | 9/2015 |
| CN | 202913644 U | 5/2013 |

* cited by examiner

FIG. 3
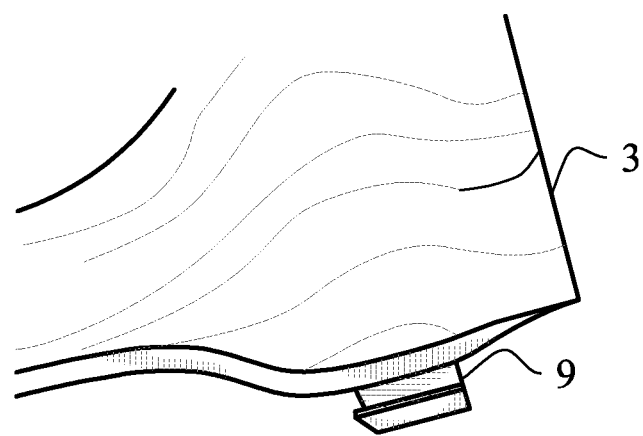
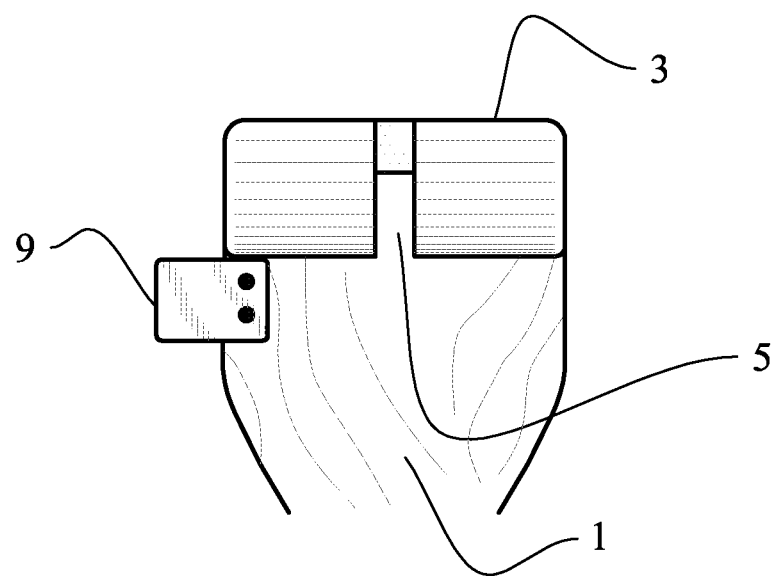
FIG. 4

FIG. 7
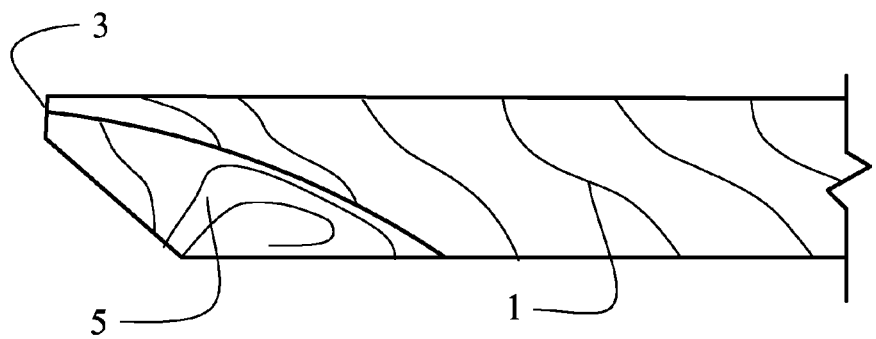
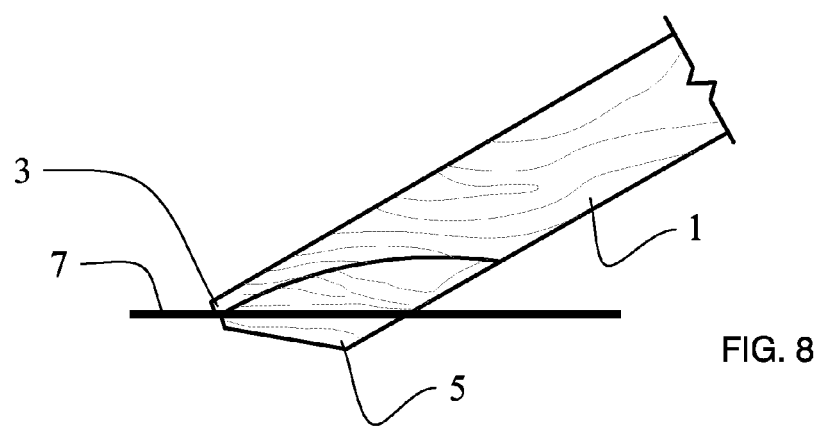
FIG. 8
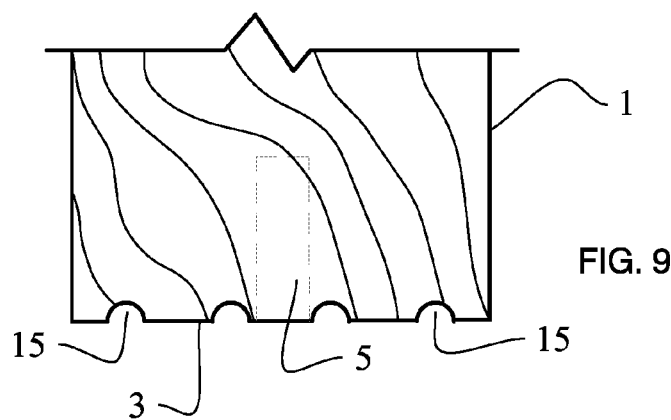
FIG. 9

FIG. 10
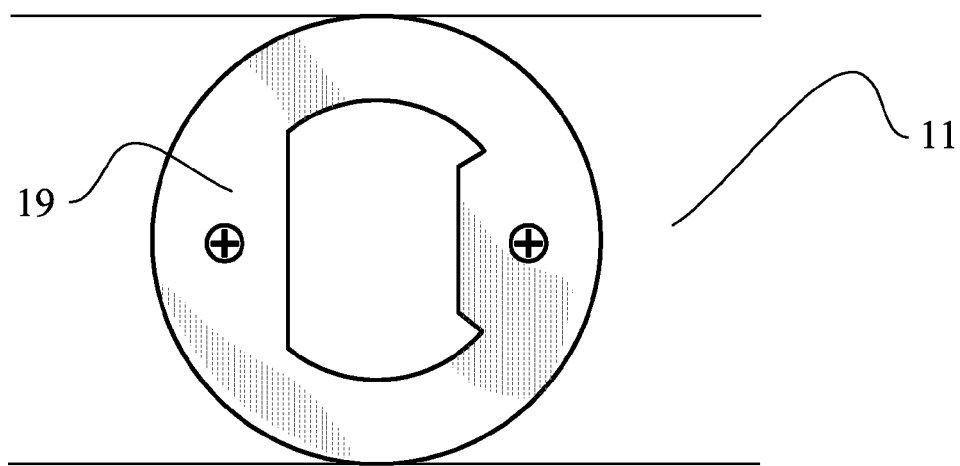
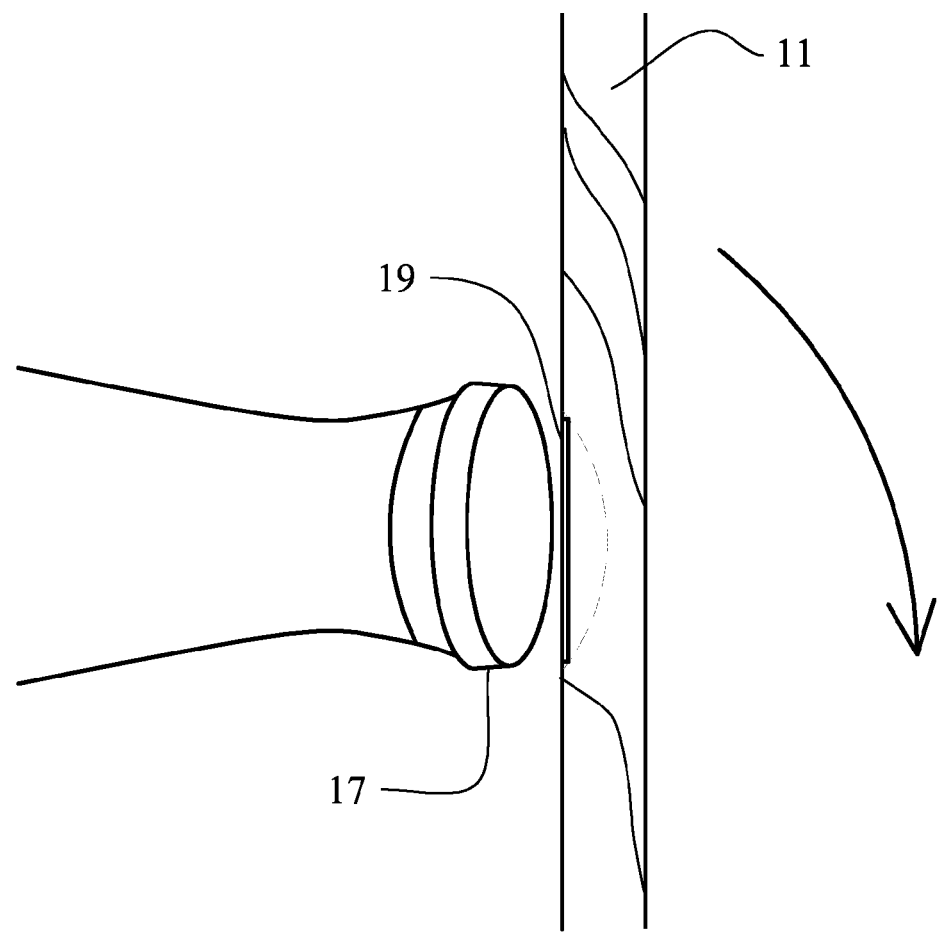
FIG. 11

US 9,943,885 B1

BBQ GRILL SCRAPER AND CLEANER

CROSS-REFERENCE TO RELATED APPLICATIONS

This application claims the benefit of provisional patent application Ser. No. 62/246,146 filed Oct. 26, 2015 by the present inventor.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present application is related to tools for safely maintaining the appearance and cleanliness of a barbeque grill. More specifically, the present application is directed to a tool for cleaning and removing debris from a cooking grate in a barbeque grill without using wire brushes that create a food-safety hazard.

BACKGROUND OF THE INVENTION

Cooking outdoors on a barbeque (BBQ) grill is very popular. Grills come in a variety of forms, including those fueled by charcoal, wood pellets, or gas. The fuel source produces the heat for cooking and the food is placed on a grate or other partially-open support structure above the heat. During use, charred debris forms on the grate surface of the grill. This charred debris is formed from the foods, such as meat or vegetables, being cooked on the grate surface. The presence of this charred debris can negatively affect the taste and appearance of food being cooked. Debris buildup can also pose a fire hazard. Thus, grill users are encouraged to regularly remove the charred debris. A wide variety of cleaning tools are commercially available for this task, including many brush and scraper tools.

Unfortunately, most commercially-available cleaning tools suffer from a number of drawbacks. Brushes often become clogged with debris and cannot be effectively cleaned. More importantly, metal brushes pose a safety risk to users. Wire bristles can break loose and get into the food. Ingesting food that contains wire bristles from wire brushes is potentially very dangerous.

Scrapers generally have a ridged scraping surface that can only clean the very top surface of the grill grate, while leaving debris remaining on the sides and bottoms of the grill grate. Scrapers made of metal are better at removing debris but can damage certain grill grates.

SUMMARY OF THE INVENTION

The present invention is directed to a barbeque grill scraper that includes a scraping end made of a material that can wear or conform to the grill grate over time and use. The scraping end includes a scraping edge and a protrusion or "tooth" that fits into the adjoining openings in the grill grate, thus allowing the scraping edge to easily travel in a straight path across the grates. The tooth keeps the scraping edge from sliding sideways on the grate surface. This keeps the scraping edge moving in a straight line which allows the scraping edge to quickly wear or conform precisely to the grate surface.

The scraping edge is drawn back and forth across a hot grill grate surface to remove char and other debris. The tooth makes it easy for the user to move the scraping edge in a straight line and also assures that the scraping edge contacts the grill grates at the same place every time. Over time, the scraping edge will wear or conform to the grate surface to allow for better cleaning.

In some embodiments to further enhance the cleaning ability, a grate cleaning tool can be attached to the scraping end. The grate cleaning tool is generally L-shaped and attached to the side of the scraping end. It can be used to reach the sides and underside of the grates to clean and loosen debris. Furthermore, the grate cleaning tool can be used to lift up hot grates to retrieve food that has fallen through the grate.

The scraping end is formed of a wearable or conformable material generally selected due to its non-toxic qualities. In some preferred embodiments, the scraping end comprises a suitable wood species, with hardwoods such as oak further preferred. The grill scraper includes a grasping end and can optionally include additional gripping features such as, for example, a reduced body profile or non-slip sleeve or wrap, so as to allow a user to easily grasp and manipulate the grill scraper. In some embodiments, the grasping end can include a hanger that can also function as a bottle opener. In other embodiments, the grasping end can include a through-hole that can serve directly as a hanger or be used to attach a lanyard or the like that can then serve as the hanger. In yet another embodiment, a bottle opener can be attached to the bottom of the grasping end with a recessed area under the opening to allow the bottle cap to engage the bottle opener.

Generally, the scraping end defines a wearable or conformable scraping edge and a tooth. The thickness of the scraping end is reduced to form the scraping edge, while the thickness of the scraping end is maintained in the area of the tooth. The leading edge of the tooth is generally angled.

The scraping end is drawn back and forth across a hot grilling surface to remove debris from the grilling grates. The tooth fits between the openings in the grate and guides the scraping end in a straight line. The scraping edge is guided by the tooth and slides back and forth along the heated grilling surface. Over time and due to friction, abrasion, and heat, grooves or indents are formed in the scraping edge that match the profile of the grill grate. This allows for more than just the upper-most grate surface to be scraped and cleaned of debris.

In some embodiments, the scraping end can be replaceably attached to the grasping end, such that the scraping end can be disposed of and replaced at the end of its useful life.

The above summary of the invention is not intended to describe each illustrated embodiment or every implementation of the present invention.

BRIEF DESCRIPTION OF THE DRAWINGS

The present invention is more completely understood in consideration of the following detailed description of various embodiments in connection with the accompanying drawings, in which:

FIG. 4 is a close-up bottom view
FIG. 7 shows a close-up side view of the scraping end
FIG. 8 shows a close-up side view of the scraper in use on the grill grate
FIG. 9 shows a top view of the scraper after grooves have formed
FIG. 10 shows a top view of the recessed bottle opener
FIG. 11 shows a side view of the recessed bottle opener and bottle cap

DRAWINGS

Figure 1:
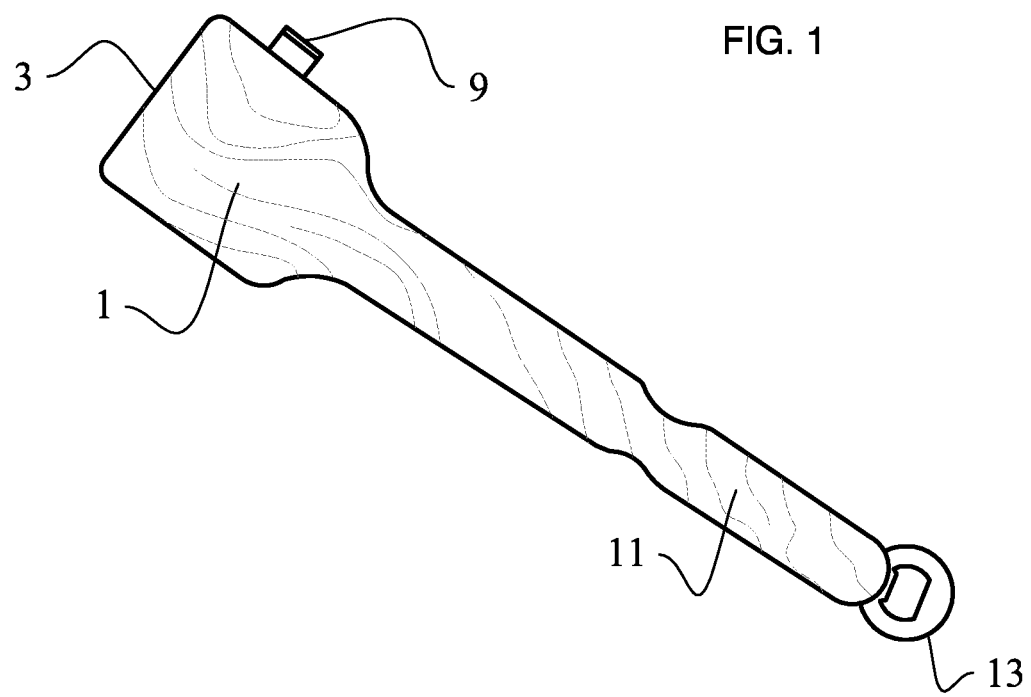
FIG. 1 is a top view

Reference Numbers 1 scraping end
3 scraping edge
5 tooth
7 grill grate
9 grate cleaning tool
11 grasping end
13 hanger
15 grooves
17 bottle cap
19 recessed bottle opener

DETAILED DESCRIPTION OF THE INVENTION

Figure 2:
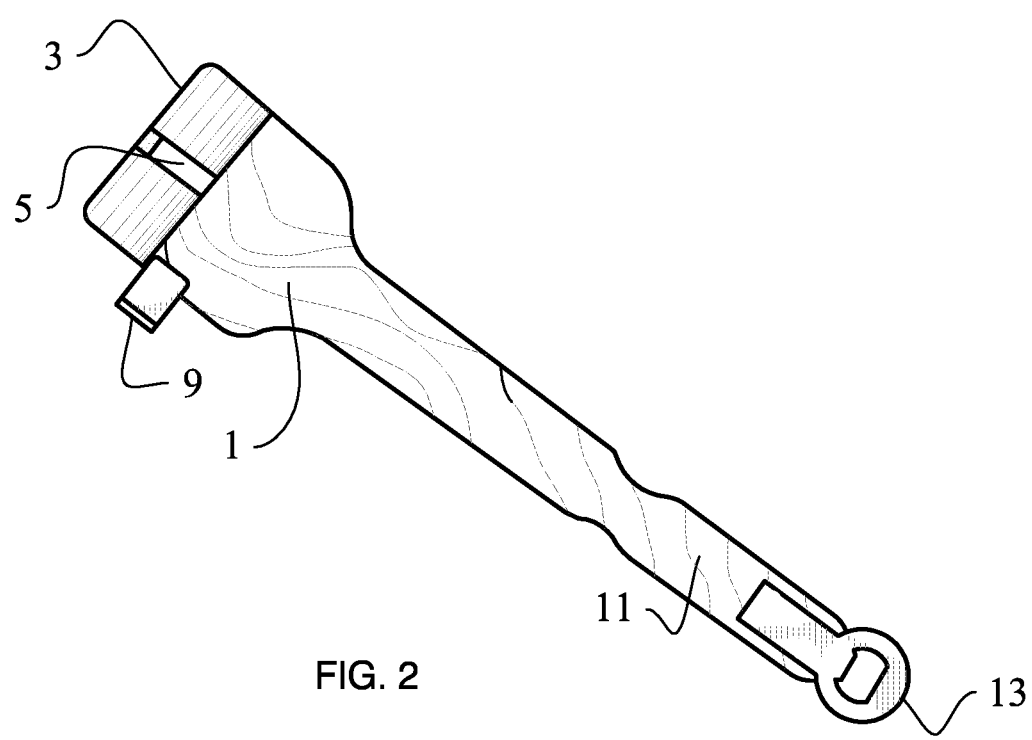
FIG. 2 is a bottom view
FIG. 3 close-up top view
Figure 5:
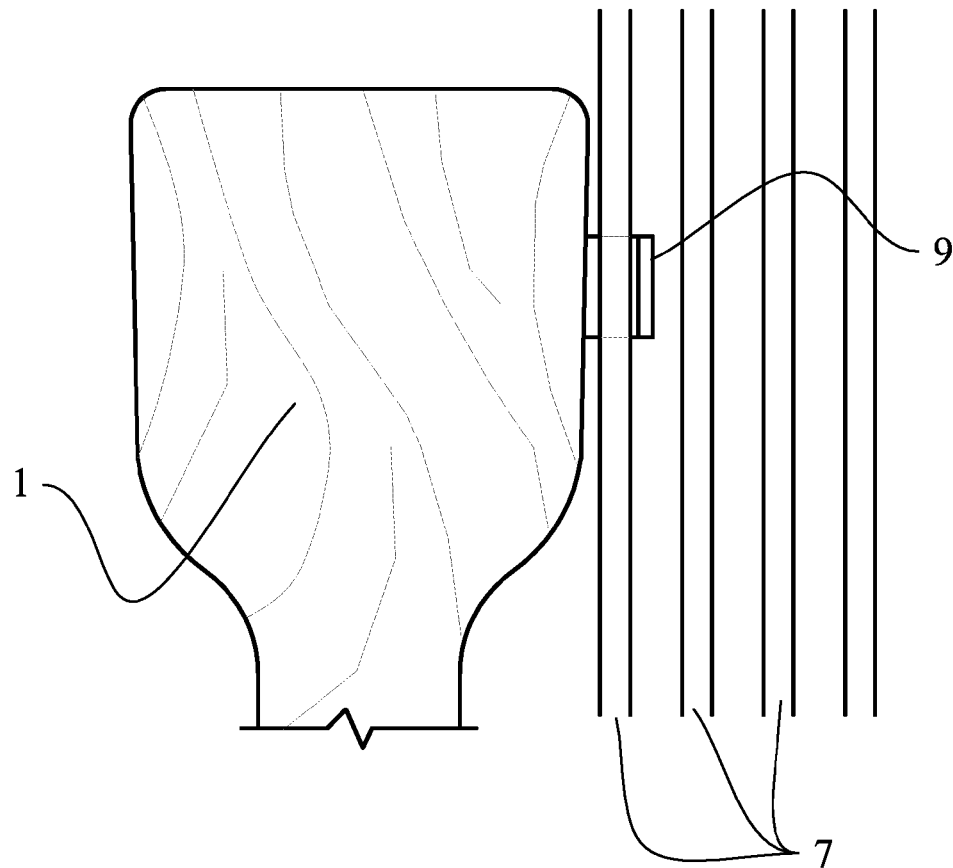
FIG. 5 shows the grate cleaning tool in use
Figure 6:
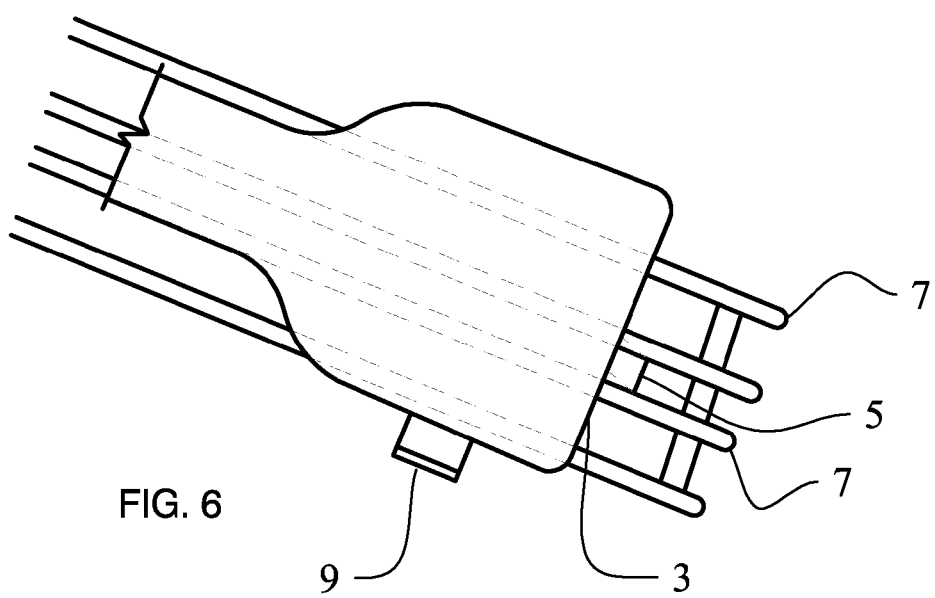
FIG. 6 shows the scraper in use on the grill grate

Referring now to the invention in more detail, in FIGS. 1-9 one or more embodiments of the invention are shown. Scraping end 1 is removably or permanently attached to grasping end 11 or formed as a single unit. Scraping edge 3 is formed at the leading edge of scraping end 1 by narrowing the thickness of scraping end 1. Grate cleaning tool 9 is attached to the side of scraping end 1. Hanger 13 is attached near the back of grasping end.

Scraping end 1 is preferably made of wood, with hardwood such as oak further preferred. Grasping end 11 can be made of wood, plastic, metal, or any suitable material that is heat-resistant and easy to grip. Scraping end 1 and grasping end 11 can be a single unit or separate and then attached. Scraping end 1 may be replaceable to extend the useful life of the scraper. Scraping end 1 is narrowed or thinned in thickness to form scraping edge 3. Scraping edge 3 is preferably made of wood, with hardwood such as oak further preferred. The profile used to create scraping edge 3 from scraping end 1 can be linear, a conic section, or any profile such to form an edge.

Grate cleaning tool 9 is preferably made of metal, with stainless steel preferred, and L-shaped with an approximately 90-degree bend. Grate cleaning tool 9 extends far enough out from scraping end 1 as to allow cleaning of the sides and underside of grill grates. The bent portion of grate cleaning tool 9 allows more effective cleaning by reaching under grill grates 7. Further, it can be used to lift grill grates 7 to retrieve dropped food items.

Tooth 5 extends below scraping edge 3. Tooth 5 can be formed from scraping end 1 by not narrowing or thinning scraping end 1 in an area where scraping edge 3 is formed. Or tooth 5 can be formed separately and attached to scraping end 1. Tooth 5 is made of wood, metal, or any heat-resistant material. The width of tooth 5 is such that it will fit between adjacent grill grates 7. The leading edge of tooth 5 is angled, rounded, or otherwise eased to more easily ride over any obstructions below grill grates 7. The depth or protrusion of tooth 5 is such that it will extend slightly below the top of grill grates 7 and guide the scraping edge 3 along the top of grill grates 7. Because only one tooth 5 is used, nearly any spacing or configuration of grill grates 7 is compatible.

Hanger 13 is preferably made of metal. It is used to hang the scraper from a nail or hook. Hanger 13 can be shaped to allow it to also open bottles such as soda or beer.

Grasping end 11 is gripped in the user's hand. Tooth 5 is positioned between adjacent grill grates 7. Scraping edge 3 is placed in contact with the top of grill grates 7 at an angle, preferably about 45 degrees above horizontal. Scraping edge 3 is moved back in forth in a straight line along the top of grill grates 7 to remove debris. Tooth 5 guides and controls the path of scraping edge 3. With use of over time, scraping edge 3 wears down and conforms to the profile of grill grates 7 by forming grooves 15. Grooves 15 provide more effective debris removal by contacting not only the top but part of the sides of grill grates 7. Grooves 15 are accurately and easily formed because of tooth 5. Without tooth 5, the user would have to exercise care to align scraping edge 3 with grill grates 7 until after grooves 15 formed. To clean the lower sides and bottom of grill grates 7, grate cleaning tool 9 is moved back and forth between and under grill grates 7. The bent section of grate cleaning tool 9 allows it to reach fully under grill grates 7 to remove debris from the bottom.

Again referring now to the invention in more detail, in FIGS. 10-11 another embodiment of the invention is shown. Recessed bottle opener 19 is attached to the bottom of grasping end 11. Recessed bottle opener 19 engages bottle cap 17 and grasping end 11 is rotated to open bottle cap 17. A section of grasping end 11 may be removed from under recessed bottle opener 19 to allow better engagement of bottle cap 17.

In broad embodiment, the present invention is a barbeque grill scraper and cleaner.

While the foregoing written description of the invention enables one having ordinary skill to make and use what is considered presently to be the best mode thereof, those having ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A barbeque grill scraper, comprising:
   a scraper having a grasping end, a scraping edge, and a tooth, the scraping edge formed of a wearable material, the tooth extending below the scraping edge and configured to fit between adjoining grill grates such that manipulation of the scraping edge along the grill grates forms a plurality of indents matching a top profile of the grill grates.

2. The barbeque grill scraper of claim 1, wherein the wearable material comprises a species of wood.

3. The barbeque grill scraper of claim 1, wherein the scraping edge is rigid.

4. A barbeque grill scraper, comprising:
   a scraper having a grasping end and a scraping end, the scraping end having a scraping edge, a tooth, and a protruding grate cleaning tool, the scraping edge formed of a wearable material, the tooth extending from the scraping edge and configured to fit between adjoining grill grates such that manipulation of the scraping edge along the grill grates forms a plurality of indents matching a top profile of the grill grates, and the protruding grate cleaning tool extending from a side of the scraping end and configured to remove debris from between and under the grill grates.

5. The barbeque grill scraper of claim 4, wherein the wearable material comprises a species of wood.

6. The barbeque grill scraper of claim 4, wherein the protruding grate cleaning tool is an L-shaped piece constructed of metal.

7. A barbeque grill scraper comprising:
a scraping end having a leading scraping edge formed by thinning a thickness of the scraping end such that manipulation of the scraping edge along grill grates forms a plurality of indents matching a top profile of the grill grates in the uninterrupted scraping edge; and
a tooth extending from the scraping edge having a thickness greater than the scraping edge and configured to fit between adjoining grill grates to align the scraping edge with the grill grates.

8. The barbeque grill scraper of claim 7, further comprising a grasping end extending from the scraping end away from the scraping edge.

9. The barbeque grill scraper of claim 7, wherein the scraping edge is linear.

10. The barbeque grill scraper of claim 7, wherein the tooth is secured along a longitudinal axis of the scraping end.

11. The barbeque grill scraper of claim 10, wherein the scraping edge is perpendicular to the longitudinal axis of the scraping end.

12. The barbeque grill scraper of claim 7, wherein the scraping end has an upper surface defining an upper plane and a lower surface defining a lower plane parallel with the upper surface, the scraping edge defined at an end of the upper surface.

13. The barbeque grill scraper of claim 12, wherein the tooth has a lower surface that is coincident with the lower plane.

14. The barbeque grill scraper of claim 13, wherein the tooth has a planar leading surface.

15. The barbeque grill scraper of claim 14, wherein the leading surface is angled relative to the upper and lower surfaces.

16. The barbeque grill scraper of claim 12, wherein a tapered surface is formed between the lower surface and the scraping edge as the thickness of the scraping end is thinned.

17. The barbeque grill scraper of claim 16, wherein the tapered surface defines an arcuate profile from the lower surface to the scraping edge in a cross-sectional plane parallel to a longitudinal axis of the scraping end and perpendicular to the upper and lower surfaces.

18. The barbeque grill scraper of claim 7, wherein the scraping edge is formed of a rigid material.

* * * * *